United States Patent [19]
Chundury et al.

[11] Patent Number: 5,106,696
[45] Date of Patent: Apr. 21, 1992

[54] POLYOLEFINS COMPATIBILIZED WITH STYRENE COPOLYMERS AND/OR POLYMER BLENDS AND ARTICLES PRODUCED THEREFROM

[75] Inventors: Deenadayalu Chundury, North Royalton; Anthony S. Scheibelhoffer, Norton, both of Ohio

[73] Assignee: Ferro Corporation, Cleveland, Ohio

[21] Appl. No.: 271,978

[22] Filed: Nov. 15, 1988

[51] Int. Cl.[5] .............................................. B32B 27/08
[52] U.S. Cl. ..................................... 428/517; 428/515; 428/516
[58] Field of Search ....................... 428/515, 516, 517; 524/451

[56] References Cited
U.S. PATENT DOCUMENTS

| | | | |
|---|---|---|---|
| 3,970,771 | 7/1976 | Davison | 428/517 |
| 4,242,418 | 12/1980 | Kitagawa | 428/517 |
| 4,356,222 | 10/1982 | Harakawa et al. | 428/517 |
| 4,418,123 | 11/1983 | Bunnelle et al. | 428/517 |
| 4,585,679 | 4/1986 | Karabedian | 428/517 |
| 4,647,509 | 3/1987 | Wallace et al. | 428/474.9 |

Primary Examiner—Jacob Ziegler
Attorney, Agent, or Firm—Renner, Otto, Boisselle & Sklar

[57] ABSTRACT

A compatibilized polymer alloy has been developed which has excellent processability under thermoforming conditions and the molded articles produced from the alloy exhibit superior gloss, shrinkage, surface hardness, polarity, strength and high heat distortion. The alloy is, in general, comprised of a polyolefin composition, a polystyrene copolymer, or polymer blend, and a compatibilizing agent. This polymer composition or alloy is particularly useful in producing packaging materials and food containers.

3 Claims, No Drawings

POLYOLEFINS COMPATIBILIZED WITH STYRENE COPOLYMERS AND/OR POLYMER BLENDS AND ARTICLES PRODUCED THEREFROM

BACKGROUND OF THE INVENTION

1. Field of the Invention

This invention relates generally to compatibilizing two incompatible polymer systems, namely: polyolefins and styrene copolymers and polymer blends. The invention also relates to compounded, compatiblized polyolefin-styrene copolymer or polymeric blend compositions and specific articles of manufacture produced therefrom.

2. State of the Art

Polymeric blends have been known for years. Typically, blends of polymers result in a material which combines the poorest properties of the constituents. This is a result of the incompatibility of the constituent polymers resulting in little, if any, adhesion at the interface between the different constituent polymers. Furthermore, this incompatibility stems in part from the structure of the individual polymers. Thermodynamically, one polymeric phase has more of an affinity for itself than for the other polymeric phase so that intermolecular forces between the two achieved because the entropy change upon mixing of high polymers is not favorable.

Such incompatibility problems may be overcome through the use of a compatibilizing agent A compatibilizing agent is a material which, on a molecular scale, has particular regions which are compatible with each of the incompatible constituent polymers Such compatibilizing agents typically surround one polymeric phase providing a chemical or physical bridge to the other polymeric phase. Insomuch as portions of the compatibilizing agent are compatible with each of the constituent polymers, the bonding between the two incompatible polymeric phases is effectively enhanced through this intermediate compatibilizing phase. Such a system of incompatible polymers coupled by a compatibilizing agent results in a material which advantageously combines the more desirable properties of the constituent polymers. Lindsey et.al., *J. Appl. Polymer Sci.*, Vol. 26, 1-8 (1981) describes a method of reclaiming mixed immiscible polymers by employing a compatibilizing agent. The system studied was a high density polyethylene (HDPE) and polystyrene (PS) and styrene-ethylene-butene-1-styrene (SEBS) copolymer as the compatibilizing agent. These ternary blends were found to possess a considerable improvement in the balance of mechanical properties over a binary blend of high density polyethylene and polystyrene.

Bartlett et.al., *Modern Plastics.* Dec. 1981, 60-62 describes a system comprising polypropylene, polystyrene and styrene-ethylene-butene-1-styrene as a compatibilizer. This work focused on those parameters that affected the extent of the polypropylene crystallinity..

Polystyrene homopolymers and copolymers compatibilized with polyolefins have been available for several years. Furthermore, molded articles have been produced from such compatibilized polymer compositions. For example, U.S. Pat. No. 4,386,187 discloses a thermoformable polymer blend of a polyolefin, a styrene polymer and a styrenic block copolymer rubber. While a number of styrene polymers and copolymers are disclosed, a copolymer of styrene and maleic anhydride is not.

U.S. Pat. No. 4,647,509 discloses a multilayer thermoformable packaging material comprising a first layer of a) a vinylidene chloride polymer, (b) an incompatible polymer, e.g., polyesters and nylons, and (c) a compatibilizing agent and a second layer of (a) a blend of an olefin polymer, a styrenic polymer, and a compatibilizing polymer, and (b) scrap material produced from the first and second layers.

U.S. Pat. No. 4,107,130 discloses a multicomponent polymer blend comprised of a polyolefin, a selectively hydrogenated monoalkenyl arenediene block copolymer, and at least one dissimilar engineering thermoplastic resin.

None of the foregoing disclosures, teach, for example, a polyolefin compatiblized with a copolymer of styrene and maleic anhydride, nor mixtures of styrene polymers and copolymers such as a polystyrene, polyphenylene oxide, elastomer blend, such as General Electric's NORYL®. These particular polystyrene systems are unique in their chemistry as well as their physical properties.

SUMMARY OF THE INVENTION

It has been discovered that a polyolefin may be compatibilized with a styrene maleic anhydride copolymer or terpolymer, e.g., styrene maleic anhydride methylmethacrylate terpolymer,or a polystyrene blend such as polystyrene, polyarylene oxide, e.g., polyphenylene oxide (PPO), and an elastomer. This system has been found to be particularly useful for thermoforming into packaging products and specifically food containers. This specific compatibilized combination has excellent heat distortion properties as well as excellent strength, toughness, stiffness, gloss and shrinkage characteristics.

There are two advantages for using styrene maleic anhydride copolymer or blends of the copolymer as opposed to other styrenic polymers. One is that styrene and maleic anhydride copolymer (SMA) has a high glass transition temperature and the second is that it is polar. The high glass transition temperature results in a higher service temperature in the final product. The polarity itself results in at least two advantages; one being the increased polarity of the surface which results in a surface more adherable to inks and the like, the other being that when talc or similar fillers are added to the polyolefin, styrene and maleic anhydride copolymer and styrene butadiene block polymer (SB) systems, the talc or similar filler resides predominently inside the polar and amorphous styrene and maleic anhydride copolymer phase. Generally talc or similar fillers deteriorate the properties of styrene polymers because of a lack of polar interactions at the interface. However, with these polar styrene and maleic anhydride copolymer systems, talc or similar fillers are found to enhance properties such as heat distortion temperature, tangent modulus, surface hardness and gloss. In addition, when contrasted to a talc filled, polyolefin, SMA and SB system is considerably less. Furthermore, the talc filled polyolefin, SMA and SB system may be processed under normal polyolefin processing conditions.

The present invention also provides a multilayer structure comprised of the polymer composition according to the invention. This structure has very low sag and is readily thermoformable.

The invention further provides compounded pellets comprising the polymer composition according to the present invention. The pellets are easily molded or extruded into the desired structure or shape.

Still further the invention provides thermoformable molded articles having high strength and a high heat distortion temperature comprising the polymer composition according to the present invention.

The invention also provides packaging and food containers formed from the polymer composition of the present invention. Because of the overall strength and high heat distortion temperature exhibited by these containers, food contained within the container may be reheated or chilled as the case may be without adversely affecting the dimensional stability of the container package.

The present invention still further provides a process for compounding and preparing the polymer composition according to the invention.

These and other aspects and advantages of the present invention will be appreciated by those skilled in the art upon the reading and understanding of the specification and claims which follow.

DETAILED DESCRIPTION OF THE PREFERRED EMBODIMENTS

A novel polymer composition comprising a polyolefin homopolymers, copolymers or blends thereof, a styrene and maleic anhydride copolymer, terpolymer or blends thereof as well as polystyrene blends with a polyarylene oxide and an elastomer and a styrene-butadiene block copolymer as a compatibilizing agent has been developed according to the present invention. Examples of the polyolefin component of this novel composition are alpha-olefin polymers such as polypropylene, high density, low density, linear low density and branched polyethylene, propylene copolymers, ethylene copolymers, ethylene-propylene copolymers, copolymers of ethylene and/or propylene with other suitable copolymerizable monomers. Further examples of suitable polyolefins include polybutene-1, poly-3-methylbutene-1, poly-4-methylpentene-1, copolymers of monoolefins with other olefins (mono- or diolefins) or vinyl monomers such as ethylene-propylene copolymer or with one or more additional monomers, e.g., EPDM, ethylene/butylene copolymer, ethylene/vinyl acetate copolymer, ethylene/ethyl acrylate copolymer, propylene/-4-methylpentene-1 copolymer and the like. The term "copolymer" includes polymers containing two or more monomeric constituents and substituted derivatives thereof. Olefin polymers such as polypropylene and polyethylene are preferred. Polypropylenes such as Himont's Profax 6523 and Shell's 7C06 are particularly preferred.

Examples of the styrene-containing component of this invention are individually or blends of styrene maleic anhydride copolymers, impact modified styrene maleic anhydride copolymer, copolymers of aromatic monomers with maleic anhydride and their derivatives, o-, m-, or p-acetoxy-styrene-maleic anhydride copolymers, alpha-methyl styrene-maleic anhydride copolymers, partially hydrolyzed or esterified-maleic-anhyride copolymers, terpolymers such as styrene-acrylonitrile-maleic anhydride, and styrene-maleic anhydride-butadiene copolymers and blends of polystyrene with a polyarylene oxide, e.g., polyphenylene oxide and an elastomer, such as General Electric's Noryl. Copolymers of styrene and maleic anhydride are preferred for the purposes of the present invention, e.g., Arco's Dylark 332 ®.

Examples of the styrene-butadiene block copolymer used in the instant invention include a diblock or multiblock styrene-butadiene copolymer, a starblock styrene-butadiene copolymer, or blends thereof. Additionally, a styrene-isoprene multiblock or starblock copolymer or their hydrogenated derivatives could be substituted for the styrene-butadiene block copolymer as a compatibilizing agent. Blends of the preceeding multi- or starblock copolymers with styrene butadiene styrene block polymers, such as Kraton G1652, have also been found to be useful. Preferred styrene-butadiene block copolymers are Phillips' K-Resin KR03 and Firestone's Stereon 840.

Examples of fillers employed in a typical compounded polymer blend according to the present invention include talc, calcium carbonate, mica, wollastonite, glass fibers, pigments such as titanium dioxide or mixtures thereof. Commercially available talc such as RT Vanderbilt's Select-O-Sorb is preferred.

While the relative amounts of the different components according to the present invention may vary over a relatively wide range depending on the specific materials used and the desired properties for the particular end uses, it has been discovered that the preferred polymer composition for the purposes of the present invention comprises:

(A) from about 49 to about 90 percent by weight of the polyolefin composition, (B) from about 10 to about 30 percent by weight of the styrenic polymer composition, (C) from about 2 to about 10 percent by weight of the compatibilizing agent, and (D) the balance comprising fillers and other compounding additives.

In a most preferred embodiment according to the present invention, the polymer composition comprises:

(A) from about 50 percent to about 52 percent by weight of polypropylene, (B) from about 18 percent to about 20 percent by weight of a copolymer of styrene and maleic anhydride, (C) from about 5 percent to about 7 percent by weight of a starblock, multiblock, diblock or mixtures thereof of copolymers of styrene and butadiene, (D) from 0 percent to about 5 percent by weight of a triblock copolymer of styrene and butadiene; and (E) about 20 percent by weight of talc.

A method of forming a compatible blend as described in this invention is to mix on a conventional Banbury mixer (Farrel) at of polypropylene, a copolymer of styrene and maleic anhydride and a styrene-butadiene block copolymer. The resultant blend is ground and subsequently injection molded (Van Dorn 110 injection molding machine) at a stock temperature of 450° F. Typical of the percentages of the individual constituents used are 87.5 weight percent polypropylene, 10 weight percent styrene maleic anhydride copolymer and 2.5 weight percent styrene-butadiene block copolymer.

A method of forming a compounded composition comprising polypropylene, styrene and maleic anhydride copolymer, styrene-butadiene multiblock copolymer, mineral filler, pigment and stabilizer includes mixing the constituents on a Farrel continuous mixer (FCM; CP-23) at 1000 rpm mixer speed, subsequent extrusion at 430° F. into strands, these strands are cooled in a water bath and subsequently pelletized. The formation of pellets being particularly advantageous as the pellets can then be injection molded with a of stock temperature and a 85° F. mold temperature resulting in a molded article.

A sheet of a compounded composition comprising polypropylene, styrene and maleic anhydride copolymer, styrene-butadiene multiblock copolymer, mineral filler, pigment and stabilizer was formed on a 3.5 inch HPM extruder with a two stage screw of 32:1 LD ratio and at a melt temperature of 445° F. This extrudate was subsequently passed through polished rolls with a center roll temperature of about 200° F. to form a sheet 48 inches wide. Such a sheet, unlike linear olefins demonstrates low sag and as a result of the styrene maleic anhydride copolymer component appropriately compatibilized with the olefin constituent, possesses an ease of processing representative of commercial styrenic polymers. Other conventional methods of laminate or multilayer processing are applicable to this invention. For instance, a barrier layer of, for example, an ethylene vinyl alcohol copolymer, may be co-extruded onto the above-described composition. In fact, multilayers of such a barrier polymer may be co-extruded onto the same composition. Processing into molded shapes may be effected by cutting the sheet into twelve inch squares, feeding the twelve inch square sheets to a CAM thermoformer, heating the sheets to their softening point, advancing the sheets to a forming station and molding the sheets by a pressure forming technique. Such molded articles as food containers, food and nonfood packages exhibit advantages over such packages already known in the art in that they possess high heat distortion temperatures, high moduli, are tougher and are easier to print with inks.

Scrap material produced from thermoforming the multilayer structure of the present invention may be recovered, reground, and recycled for use as a component in the polyolefin containing layer. Such scrap material will contain components from both the barrier layer and polyolefin containing layer. As the material of the present invention is produced and thermoformed, the scrap composition in the polyolefin containing layer will reach a steady state level if total recycling of scrap is utilized. This steady state level will vary depending on the overall amount of scrap produced relative to the amount of material utilized in the thermoforming process. This level will of course vary depending on the type of container or package being formed. The amount of scrap utilized in the polyolefin containing layer may vary widely and may make up from 1 to 99% by weight, and preferably about 10 to 60% by weight, of the polyolefin containing layer.

Various features and aspects of the present invention will be further illustrated in the examples that follow. While these examples are presented to show one skilled in the art how to operate within the scope of this invention, they are not to serve as a limitation on the scope of the invention where such scope is only defined in the claims. Moreover, in the following examples, preparation of blends, compounds, injection molded specimens, monolayer or laminated sheets and thermoformed containers are presented. These examples serve merely as illustrative embodiments of the present invention and are not to be considered limiting. The percentages reported in this application are by weight or unless otherwise stated differently. The physical properties described in the embodiments were measured as per ASTM standard test procedures.

EXAMPLE 1

The physical properties of blends containing polypropylene (PP), styrene maleic anhydride (SM(A)) copolymer, starblock or multiblock, styrene-butadiene (SBR) copolymer vary widely with composition and process of which the following is an example: A compatible blend was prepared on a typical laboratory Banbury ® mixer (Farrel) at 310° F., ground and injection molded ('Van Dorn 110' at 450° F. stock temperature) into test specimens. The composition and properties of compatible blends and controls were reported in Table 1 as follows:

TABLE 1

| Composition: | | |
|---|---|---|
| Himont Profax 6523 (PP) | 100 | 87.5 |
| Arco Dylark 332 (SMA) | — | 10.0 |
| Phillips K-Resin KRO3 (SBR) | — | 2.5 |
| Properties: | | |
| Melt Flow g/10 min. (Condition L) | 4.5 | 4.1 |
| Tensile Strength, psi | 4,990 | 5,070 |
| Flexural Modulus, psi | 230,000 | 274,000 |
| Flexural Strength, psi | 7,360 | 8,490 |
| Notched Izod Impact, ft./lb./in. | 0.52 | 0.74 |
| Gardner Impact, in./lbs. | 21 | 16 |
| HDT at 66 psi, °F. | 153 | 219 |
| Linear Shrinkage, (in/in)% | 1.6 | 1.3 |

In addition, the molded specimens of the above blends have excellent surface characteristics with respect to appearance and hardness.

EXAMPLE 2

A multiblock SBR copolymer was used to prepare a unique compound comprising PP, SMA copolymer, SBR multiblock copolymer, mineral filler (Talc), pigment (TiO$_2$) and stabilizer. The compound was prepared on Farrel Continuous Mixer (FCM), CP-23 at 1000 rpm (mixer speed) and extruded at 430° F. onto strands which were passed through a water bath prior to pelletizing. The pellets were injection molded (430° F. stock temperature and 85 F. mold temperature) into test specimens. Table 2 gives the compositions and the physical properties obtained.

TABLE 2

| Composition: | |
|---|---|
| Shell 7CO6 (PP) | 52.45% |
| Arco Dylark 332 (SMA) | 20.00% |
| Firestone Stereon 840 (SBR) | 5.00% |
| RT Vanderbelt Select-O-Sorb (talc) | 20.00% |
| CR-834 (TiO$_2$) | 2.50% |
| Ciba-Geigy Irganox 1010 (Stabilizer) | 0.05% |
| Properties: | |
| Melt Flow, g/10 min. | 2.0 |
| Tensile Strength, psi | 4036 |
| Flexural Modulus, psi | 373,000 |
| Flexural Strength, psi | 5,967 |
| Izod, Notched, ft./lb./in. | 0.71 |
| Izod, unnotched, ft./lb./in. | 8.40 |
| Gardner Impact, lb./in. | 27 |
| HDT at 66 psi, °F. | 244 |
| Shrinkage, (in/in.)% | 0.7 |

Besides the high-heat distortion temperature and low shrinkage characteristics of the above compound, the molded specimens also exhibit high gloss and scratch resistant surface characteristics.

EXAMPLE 3

A sheet was formed on a 3.5" HPM extruder, with a two-stage screw of 32:1 L/D ratio and at a melt temperature of 445° F., from the compound prepared in Example 2. The extrudate was passed through polished rolls with a center roll temperature of about 200° F. to form a sheet 48" wide. The sheet was cut into about 12 inch squares and these 12 inch squares were then fed to a CAM thermoformer. When the squares were heated to their softening point, they were advanced to a forming station, where the squares were molded to the shape of a cup by a pressure forming technique. The resulting cups were excellent in appearance and detail. It was noted that the exceptional thermoformability was consistent with that of commercial styrenics. The talc-filled cups have superior gloss characteristics compared to a typically filled polypropylene compound. It was also demonstrated that the above extruded sheet could be laminated on both sides with polypropylene and/or a 20% talc filled polypropylene sheet and subsequently thermoformed into cups of high quality in a single operation. Very good adhesion between the layers of sheets was also noticed. The trimmed waste from the monolayer or laminate structure is ground and fed back into a mixing unit, where it is physically blended with neat stock compounded pellets. This mixture may be processed as described in this example to form a sheet product.

EXAMPLE 4

The procedure of Example 3 was repeated with an addition of 5% Stereon 840 (Firestone) or a styrene-ethylene-butylene-styrene block copolymer (e.g., Shell Kraton G 1652) at the expense of the polypropylene in the final composition. This inclusion of additional compatibilizer provided improvements in certain properties such as impact resistance and adhesion between laminate structures for both molded articles and sheet material.

While the invention has been described and illustrated with reference to certain preferred embodiments thereof, those skilled in the art will appreciate that various changes, modifications and substitutions can be made therein without departing from the spirit of the invention. For example, processing and molding techniques other than those preferred as set forth hereinabove may be applicable due to variations in the desired end product and uses, etc. Moreover, the specific results observed with respect to the physical properties may vary depending on the specific polymers and formulations selected and whether same are used alone or in combination with each other, i.e., mixture, or other known agents. Accordingly, such expected changes and variations in results are contemplated in accordance with the objects and practices of the present invention. It is intended therefore, that the invention be limited only by the scope of the claims which follow.

I claim:

1. A thermoformable multilayer structure comprising:
   (. a first layer of a blended polymer composition comprising a polymer blend of:
      (A) from about 50 percent to about 52 percent by weight of polypropylene,
      (B) from about 18 percent to about 20 percent by weight of a copolymer of styrene and maleic anhydride,
      (C) from about 5 percent to about 7 percent by weight of a starblock, diblock or mixtures thereof copolymer of styrene and butadiene,
      (D) about 5 percent by weight of a triblock copolymer of styrene and butadiene; and
      (E) about 20 percent by weight of talc; and
   II. at least one additional layer of polypropylene.

2. A coextruded multilayer structure, wherein at least one layer comprises the composition of claim 1.

3. A molded article having a desired shape produced from a thermoformable multilayer structure comprising:
   I. one layer of a blended polymer composition comprising a blend of:
      (A) polypropylene;
      (B) a copolymer consisting essentially of styrene and maleic anhydride;
      (C) a multiblock styrene-butadiene block copolymer;
      (D) a styrene-ethylene-butylene-styrene triblock copolymer; and
      (E) talc; and
   II. two additional layers of polypropylene.

* * * * *